United States Patent [19]
Correns et al.

[11] Patent Number: 5,841,207
[45] Date of Patent: Nov. 24, 1998

[54] MODULAR TWO-COORDINATE PLANAR MOTOR

[75] Inventors: Nico Correns, Weimar; Jürgen Löbel, Jena; Eckhard Wendorff, Suhl, all of Germany

[73] Assignee: Pasim Mikrosystemtechnik GmbH, Suhl, Germany

[21] Appl. No.: 543,596

[22] Filed: Oct. 16, 1995

[30] Foreign Application Priority Data

Oct. 17, 1994 [DE] Germany .................. 9-44-36-865.8

[51] Int. Cl.⁶ .................. H02K 1/12; H02K 41/00
[52] U.S. Cl. .................. 310/12; 310/13; 310/14; 310/42; 310/112
[58] Field of Search .................. 310/12, 13, 14, 310/42, 112

[56] References Cited

U.S. PATENT DOCUMENTS

| | | | |
|---|---|---|---|
| Re. 27,436 | 7/1972 | Sawyer | 310/12 |
| 4,620,253 | 10/1986 | Garwin et al. | 360/107 |
| 4,835,424 | 5/1989 | Hoffman et al. | 310/12 |
| 5,128,569 | 7/1992 | Gladish | 310/12 |
| 5,153,494 | 10/1992 | Hollis, Jr. | 318/640 |
| 5,179,305 | 1/1993 | Van Engelen | 310/13 |
| 5,519,266 | 5/1996 | Chitayat | 310/12 |
| 5,703,418 | 12/1997 | Assa | 310/12 |

*Primary Examiner*—Thomas M. Dougherty
*Assistant Examiner*—Tran N Nguyen
*Attorney, Agent, or Firm*—Cohen, Pontani, Lieberman & Pavane

[57] ABSTRACT

A modular planar motor having (a) a mounting plate which has (i) a plurality of openings therein each having an interior surface, (ii) a housing, (iii) a surrounding ridge, and (iv) an undersurface, (b) a superstructure over the mounting plate, and (c) a plurality of modular components each disposed within the openings and having a covering hood for the components, and (d) an aligning and gluing gap between the modular components and the mounting plate and being filled with an adhesive composition for bonding the modular components to the mounting plate.

6 Claims, 9 Drawing Sheets

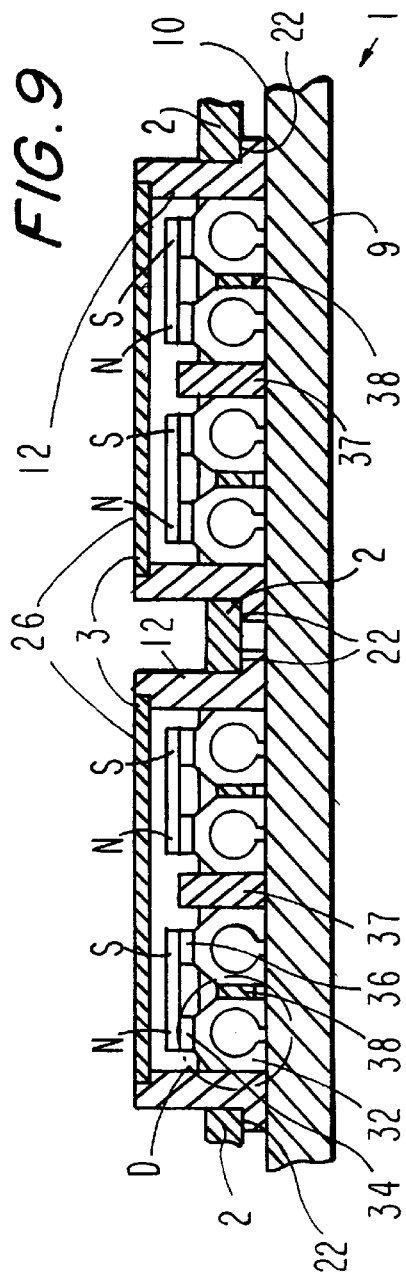
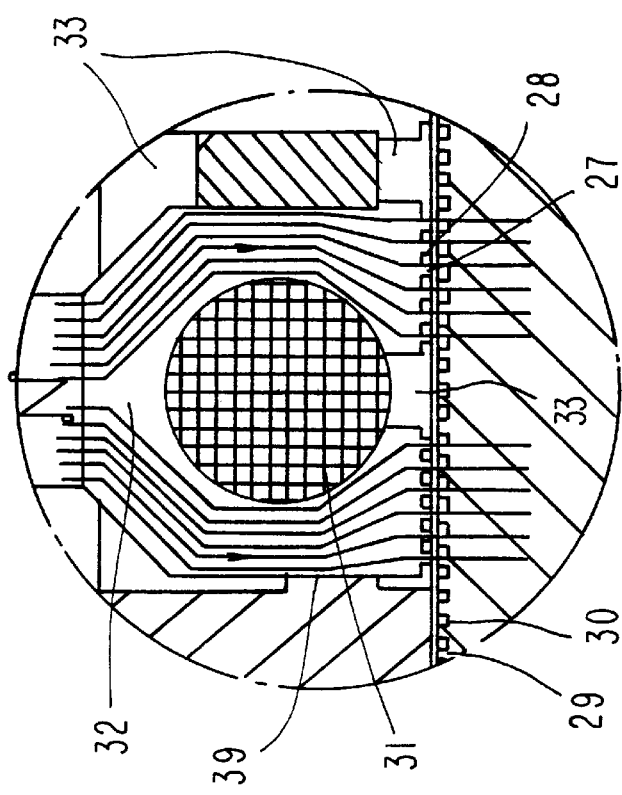

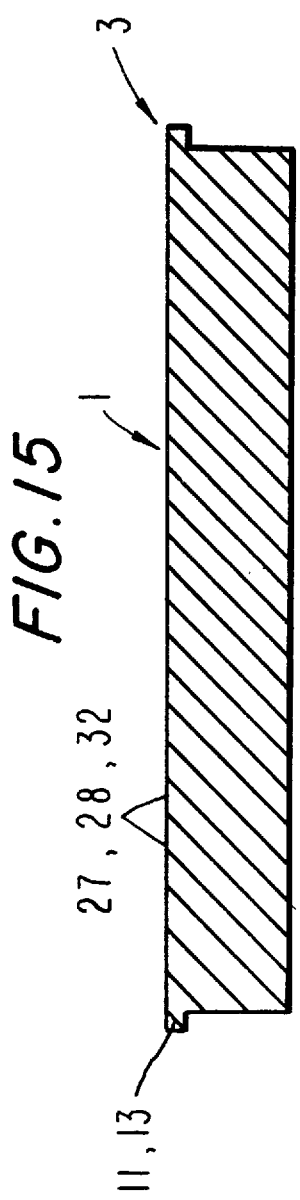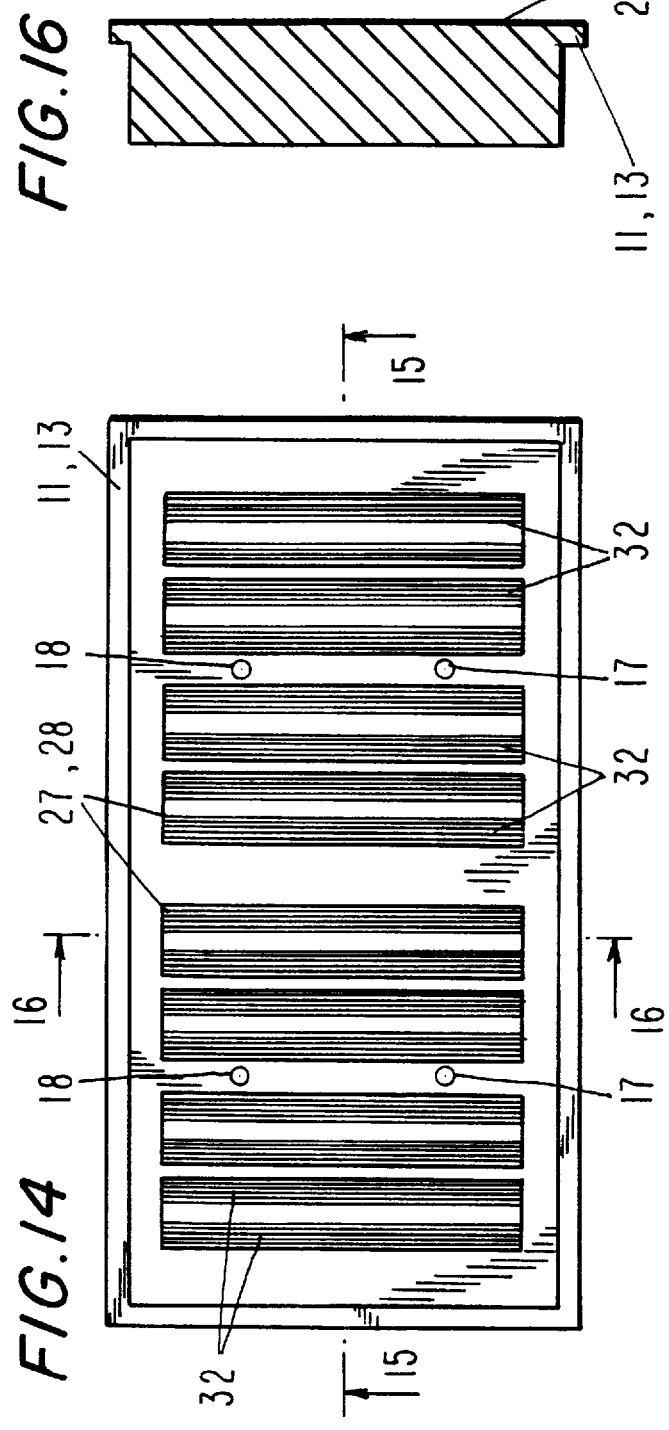

MODULAR TWO-COORDINATE PLANAR MOTOR

AREA OF APPLICATION

The invention relates to a modular planar motor and to the process for making it. Such planar motors are used, in particular, for hybrid and stepping-motor-like planar units for fine positioning.

CHARACTERISTICS OF THE KNOWN STATE OF THE ART

It is known in the art that large planar motors are constructed in one piece. For this purpose, two or more driving elements are provided for the x direction and two or more driving elements for the y direction.

Moreover, the large planar motor units were also produced as a whole. The driving elements for the x direction and the driving elements for the y direction lie next to one another. For example, it was proposed in the German Offenlegungsschrift 2345456 that in each case two driving elements for the x direction and two for the y direction be provided in one plane, the individual driving elements in each case having winding disposed in two rows. With the German Offenlegungsschriften 16223832 and 1788154, a further configuration of a planar motor was disclosed, for which two driving elements for the x direction and two driving elements for the y direction are also integrated in one plane.

The U.S. Pat. No. 3,851,196 also discloses a planar unit, for which one driving unit for the x direction as well as two driving units for the y direction are integrated in the motor. It is, however, a disadvantage that, during the whole of the manufacturing phase, there is a considerable risk, which results from the extensive machining. In particular, the introduction of parallel, fine grooves and the fine grooves disposed at right angles to these require a very high degree of accuracy and meticulousness, since otherwise the function cannot be realized in the desired quality of accuracy due to a defective arrangement and configuration of the function elements.

The risk that, in the case of large planar motors, errors will occur in the final phase of the machining and structuring of large motors, increases with the size of the motor. Very high technical and technological efforts are therefore required.

SUMMARY DESCRIPTION OF THE INVENTION

It is an object of the invention to provide a modular planar motor and the process for its manufacture, with which the disadvantages of the state of the art are reduced and eliminated and which has such a structure, that the risk associated with producing the filigree structure in large planar motors is decreased significantly.

The invention is based on the task of producing a modular planar motor and the process for making it, which motor has a simple construction and for which the known, expensive, complicated and high-risk filigree structuring can be carried out in a simpler, more controllable manner, it being possible to increase the dimensions of the motor at will without increasing the manufacturing risk and, instead, keeping it almost constant. Pursuant to the invention, this objective is accomplished owing to the fact that an overall arrangement is built up from a mounting plate and several modular components and that the mounting plate has a covering hood as well as several openings for accommodating modular components and that the modular components have a housing with a surrounding ridge and that, between the outer wall of the housing as well as the surface of the surrounding ridge and the inner wall of the openings in the plate as well as the lower surface of the mounting plate, an alignment and adhesive gap is provided, which is filled with an adhesive composition.

It is an advantageous distinguishing feature that the adhesive composition in the alignment and adhesive gap is a curable, elastic, filled epoxide resin.

The invention furthermore is distinguished owing to the fact that the overall arrangement represents a 4-part, modular planar motor and has two modular components for operating in the x direction and two modular components for the operating in the y direction. In a particular embodiment of the invention, the overall arrangement represents an 8-part modular planar motor and has four modular components for operating in the x direction and four modular components for operating in the y direction and has a central recess in the middle region.

The invention furthermore is distinguished owing to the fact that the overall arrangement has a connecting adapter and is disposed on a stator and that the stator has a stator structure, the stator structure representing a cross structure, and that the stator has a surrounding edge and a terminal box, an electropneumatic flat conductor being provided between the terminal box and the connecting adapter.

It is a distinguishing feature of the invention that the cross structure has a plurality of stator teeth, which are constructed in tower and pixel fashion and are surrounded by net-like stator teeth gaps enclosing the stator teeth.

Pursuant to the invention, provisions are made in an advantageous manner so that the following process steps are realized:

1. The modular components are put in place in the openings of the mounting plate.
2. The mounting plate, equipped after step 1 of the process, is placed on a cross structure, so that the motor teeth and the gaps between the motor teeth of the iron core of the modular component are disposed above the stator teeth and the gaps between the stator teeth of the stator structure.
3. The mounting plate, equipped after step 2 of the process, is energized, so that the modular components of FIG. 12 are aligned. The air suspension is then switched off.
4. The modular components, held on the stator structure after step 3 of the process, are encapsulated in the alignment and adhesive gaps with an adhesive composition.
5. The modular components, encapsulated in the mounting plate after step 4 of the process, are fixed relative to one another by the curing of the adhesive composition in the alignment and adhesive gaps.
6. The overall arrangements, now cured after step 5 of the process, are lifted from the stator by switching on the air suspension and then taken off.
7. The overall arrangement, existing after steps 5 and 6 of the process, is then deposited on similarly structured stators for the operation.

BRIEF DESCRIPTION OF THE DRAWING

The invention will now be described in greater detail by means of the following drawings, in which:

FIG. 9: shows a basic representation of an inventive modular planar motor in partial section, for which two modular components are disposed one behind the other, FIG. 10: shows a detail D of FIG. 9 in the non-energized state.

FIG. 14: shows a view of the inventive modular component from below, FIG. 15: shows a front view of an inventive modular component of FIG. 14 in section and FIG. 16: shows a side view of an inventive modular component of FIG. 14 in section.

DETAILED DESCRIPTION

Figure 2:
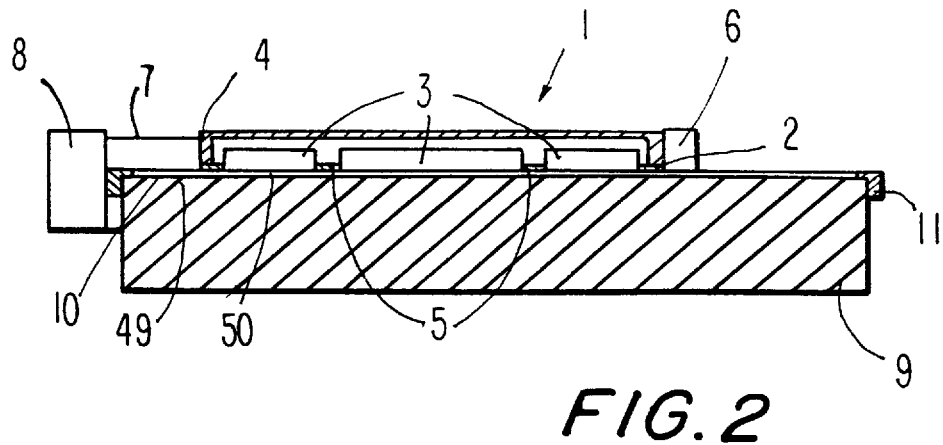
FIG. 2: shows a basic representation of an inventive modular planar motor of FIG. 1 in front view and section.
Figure 1:
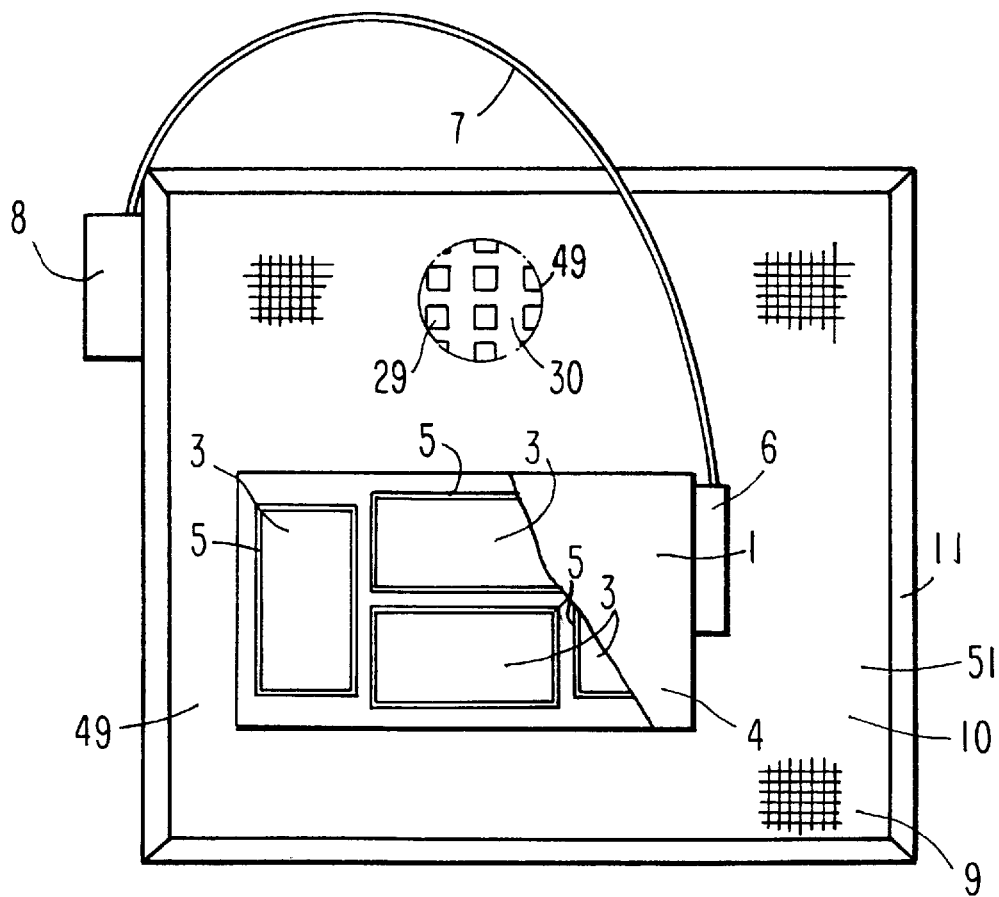
FIG. 1: shows a basic representation of an inventive modular planar motor in plan view.

FIGS. 1 and 2 show a basic representation of an inventive, modular planar motor in plan view. The superstructure 1 comprises a mounting plate 2, in the openings 5 of which modular components 3 are accommodated. A covering hood 4 is placed on the mounting plate 2 and a connecting adapter 6 is coupled in the lateral region. An electropneumatic energy flat conductor 7 runs from the connecting adapter 6 to the terminal box 8, the terminal box 8 being coupled to the stator 9. At the surface, the stator 9 has a stator structure 10, which is a cross structure 49 here. According to FIG. 1, the stator structure 10 is bordered by an edge 11. The underside of the overall arrangement 1 comes to rest on an air suspension, the details of which are not given here, on the upper cross structure 49.

FIG. 2 shows a basic representation of an inventive, modular, planar motor of FIG. 1 in front view and section. The superstructure 1 is above an air gap 50 on the stator 9. The stator 9 has a stator structure 10, which is a cross structure lattice 49 here. The stator 9 is bordered by an edge 11, the terminal box 8 being coupled to the edge 11. The electropneumatic energy flat conductor 7 is taken from the terminal box 8 to the connector adapter 6, the connecting adapter 6 being coupled to the superstructure 1. The superstructure 1 is above the mounting plate 2, and includes the openings 5 in which accommodate modular components 3. The covering hood 4, to which the connecting adapter 6 is coupled, is fastened to the mounting plate 2.

Figure 3:
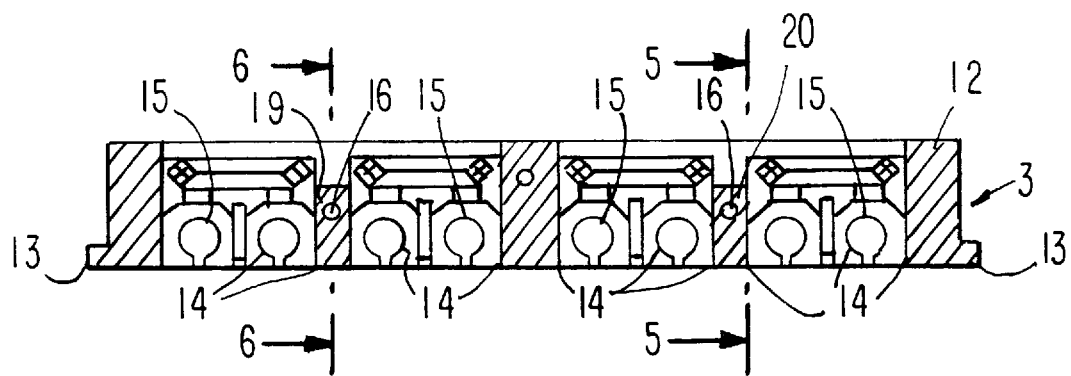
FIG. 3: shows a basic representation of an inventive modular component in front view and in full section.

FIG. 3 shows a basic representation of an inventive modular component in front view and in full section. The modular component 3 has a housing 12 with a surrounding ridge 13 and comprises four winding recesses 14, in which the windings 15 are accommodated. In the left region between the windings 15, a ridge of the housing 12 is provided, the details of which are not given and which contains the left air duct 19. A central region, a broader ridge of the housing, adjoins the left region with the windings 15. In the right region, the arrangement of the windings is almost a mirror image of that in the left region. Windings 15 have also been accommodated in the two winding recesses 14 in the right region. A ridge of the housing 12, which is not described in greater detail and contains the right air duct 20, is disposed between the two right windings 15.

Figure 4:
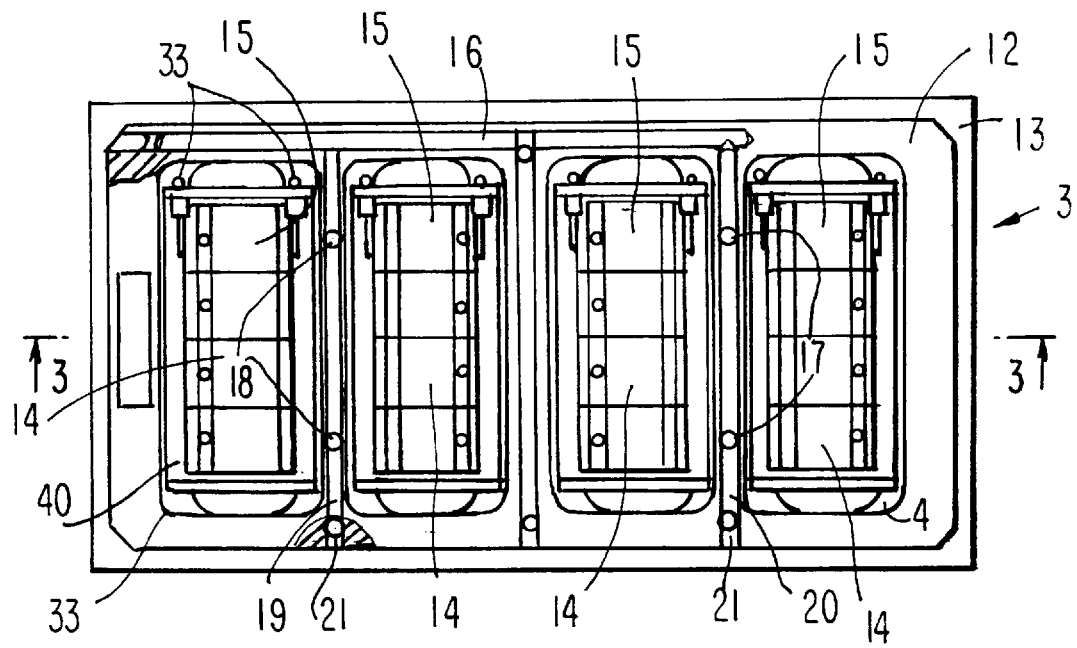
FIG. 4: shows a basic representation of an inventive modular component of FIG. 1 in plan view and partial section.

FIG. 4 is a basic representation of the inventive modular component of FIG. 3 in plan view and partial section. The modular component 3 consists of a housing 12, which has a surrounding ridge 13. In the housing 12, winding recesses 14 are provided, in which the windings 15 are accommodated and which are glued in with a casting composition 33. In the upper region of the representation, an air supply 16 is provided, which discharges into a left air duct 19 and a right air duct 20. The left air duct 19, which is provided in the left region 40, has a sealing plug 21 and two left air nozzles 18. The right air duct 20, provided in the right region 41, has a sealing plug 21 and two right air nozzles 17.

Figure 5:
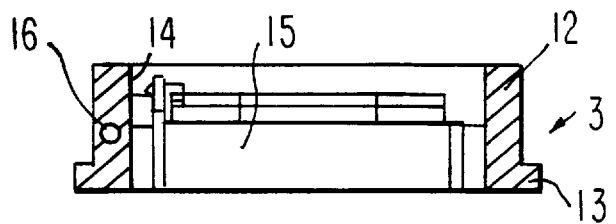
FIG. 5: shows a basic representation of an inventive modular component along section B—B of FIG. 3 in side view.

FIG. 5 shows a basic representation of an inventive modular component along section B—B of FIG. 3 in side view. The modular component 3 has a surrounding ridge 13, a winding recess 14 and an air supply 16. The winding 15 is accommodated firmly in the winding recess 14 and encapsulated with the casting composition 33.

Figure 6:
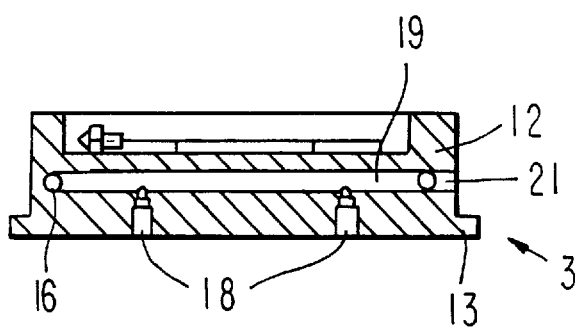
FIG. 6: shows a basic representation of an inventive modular component along section A—A of FIG. 3 in side view.

FIG. 6 is a basic representation of an inventive modular component along section A—A of FIG. 3 in side view. The modular component 3 consists of the housing 12, a surrounding ridge 13, an air supply 16 and a left air duct 19, which adjoins the air supply 16 and is closed off by a sealing plug 21. In the lower region of the housing 12, two left air nozzles are embedded, which are connected with the left air duct 19. The left air nozzles 18 are screwed in.

Figure 7:
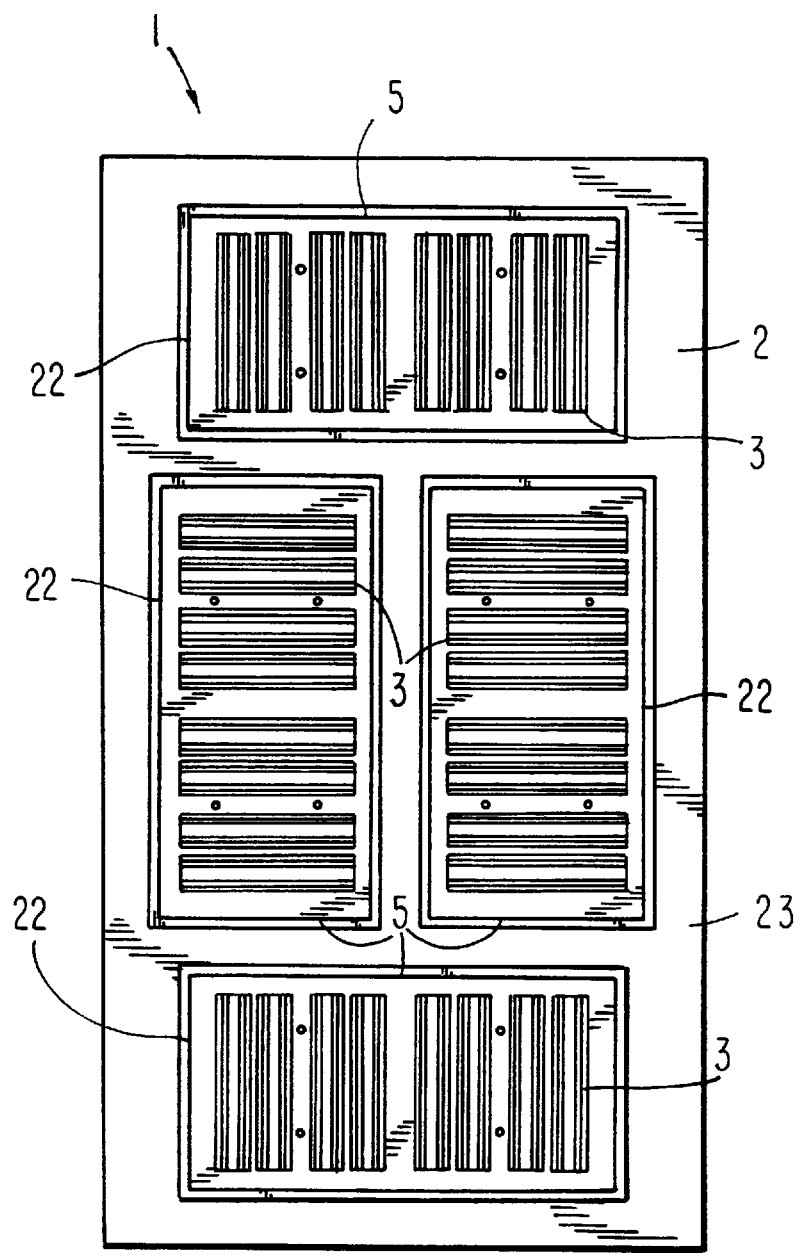
FIG. 7: shows a basic representation of an inventive variation of a modular planar motor with four modular components.

FIG. 7 shows a basic representation of an inventive variation of a modular planar motor with four modular components. The superstructure 1 represents here a 4-part modular planar motor 23. The mounting plate 2 in each case accommodates one modular component 3 in its openings 5. An alignment and gluing gap 22 is provided between the modular component 3 and the plate openings 5. The alignment and gluing gap 22, in turn, is filled with a casting composition 33, which is slightly elastic.

Figure 8:
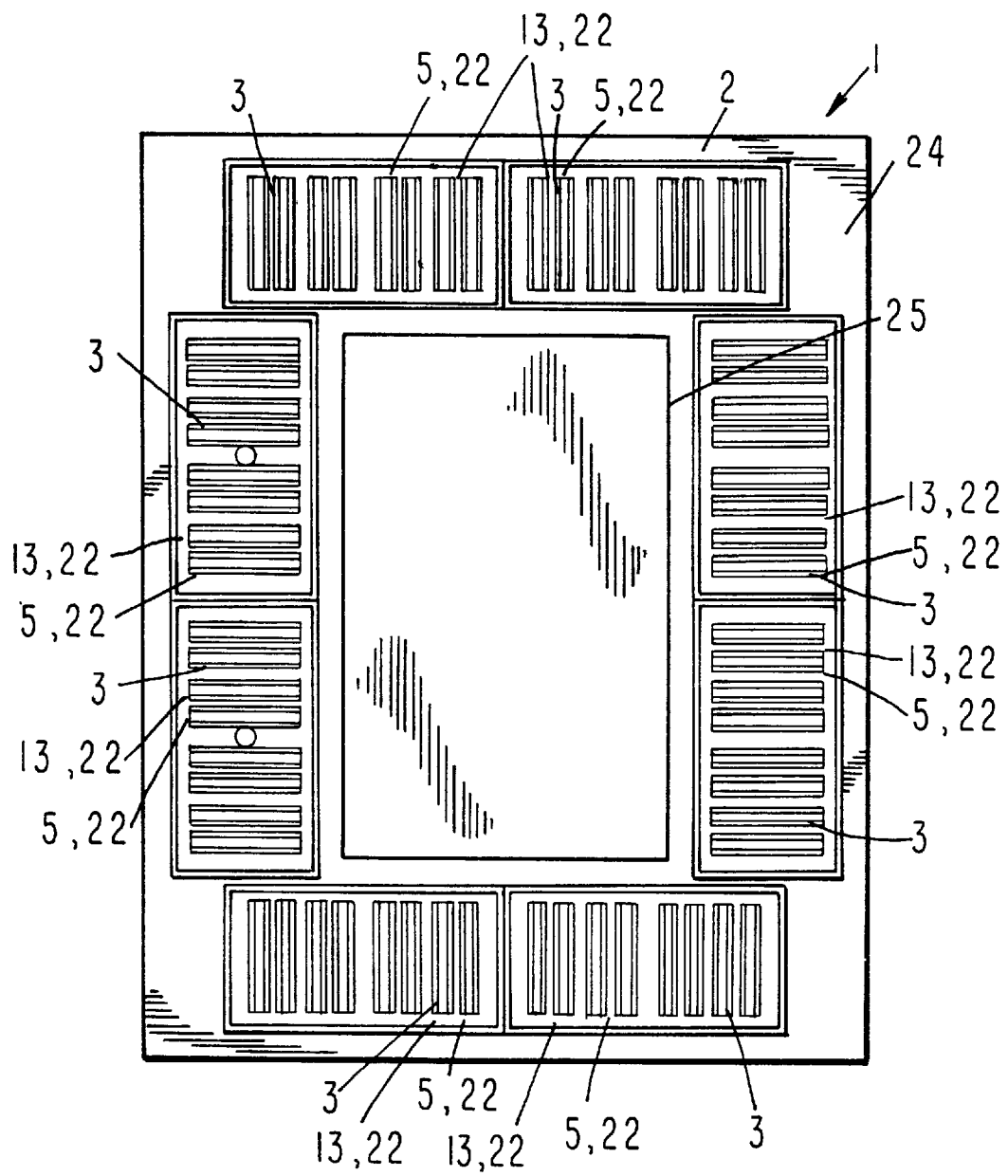
FIG. 8: shows a basic representation of an inventive variation of a modular planar motor with eight modular components and a central clearance.

FIG. 8 shows a basic representation of an inventive variation of a modular planar motor with eight modular components and a central clearance. The superstructure 1 represents an 8-part modular planar motor 24 and consists here of a mounting plate 2, the plate openings 5 as well as a central recess 25 and the modular components 3 accommodated in the openings 5 of the plate.

FIG. 9 shows a basic representation of an inventive modular planar motor in partial section, for which two modular components are disposed one behind the other. The superstructure 1 is on the stator 9 with a stator structure 10. The superstructure 1 is formed here includes a mounting plate 2 and includes the modular components 3, the mounting plate 2 having openings 5, in which the modular components 3 are accommodated. Between the modular components 3 and the plate openings 5, alignment and gluing gaps are provided, which are filled with a casting composition 33. The modular components 3 have a housing 12, in which the iron core with coils 31 is accommodated. A spacer 38 is provided between the left iron core 32 and the right iron core 32. A left magnet 34 is mounted on the left iron core and a right magnet 36 on the right iron core. After the transverse yoke 35 is applied, the left magnet 34 forms the south pole. There is a central ridge 37 in the center of the housing 12. To the right of the central ridge, there is once again the same arrangement that has already been described above in connection with FIG. 9.

FIG. 10 shows a basic representation of an inventive modular planar motor in partial section of FIG. 9, detail D, in the non-energized state.

The field lines pass through the iron core 32. The iron core 32 lies on the left side at the boundary ridge 39 and the spacer 38 and is embedded by means of the casting composition 33. The coil 31 is at the center of the iron core 32. At the surface of the stator 9, a stator tooth 29 alternates with a stator gap 30, the stator tooth gap also being filled with casting composition 33. At the underside of the iron core 32, motor teeth 27 and motor teeth gaps 28 alternate, the motor teeth gaps 28 also being filled with casting composition 33.

Figure 11:
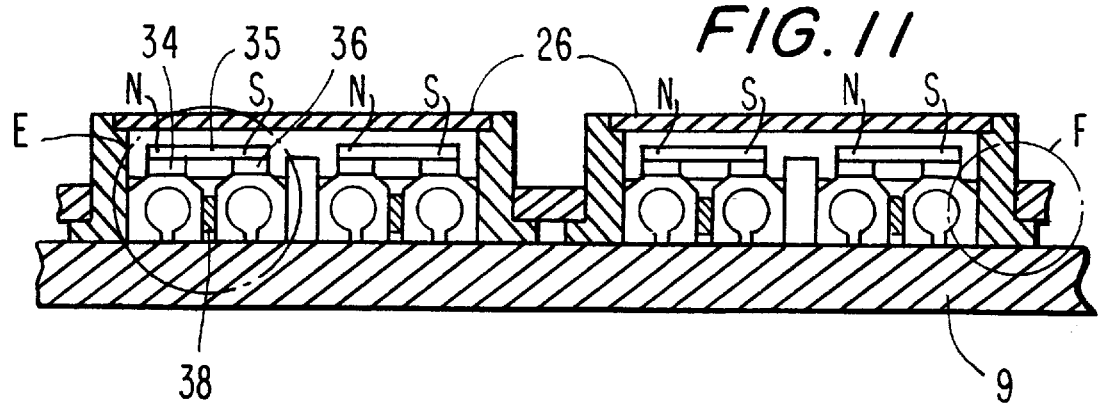
FIG. 11: shows a basic representation of an inventive modular planar motor in partial section, for which two modular components are disposed one behind the other in the energized state.

FIG. 11 shows a basic representation of an inventive modular planar motor in partial section, for which two modular components are disposed one behind the other in the energized state.

Figure 12:
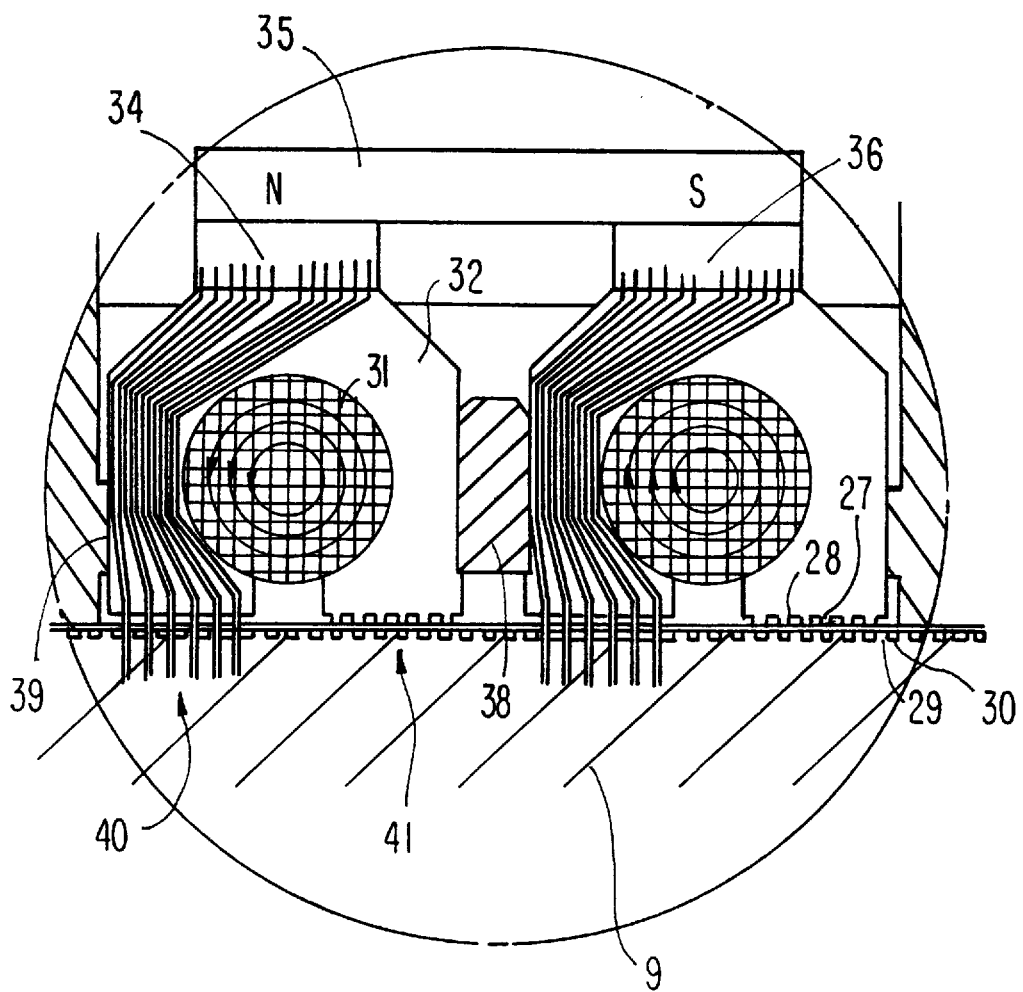
FIG. 12: shows a detail of FIG. 11 in the energized state.
Figure 13:
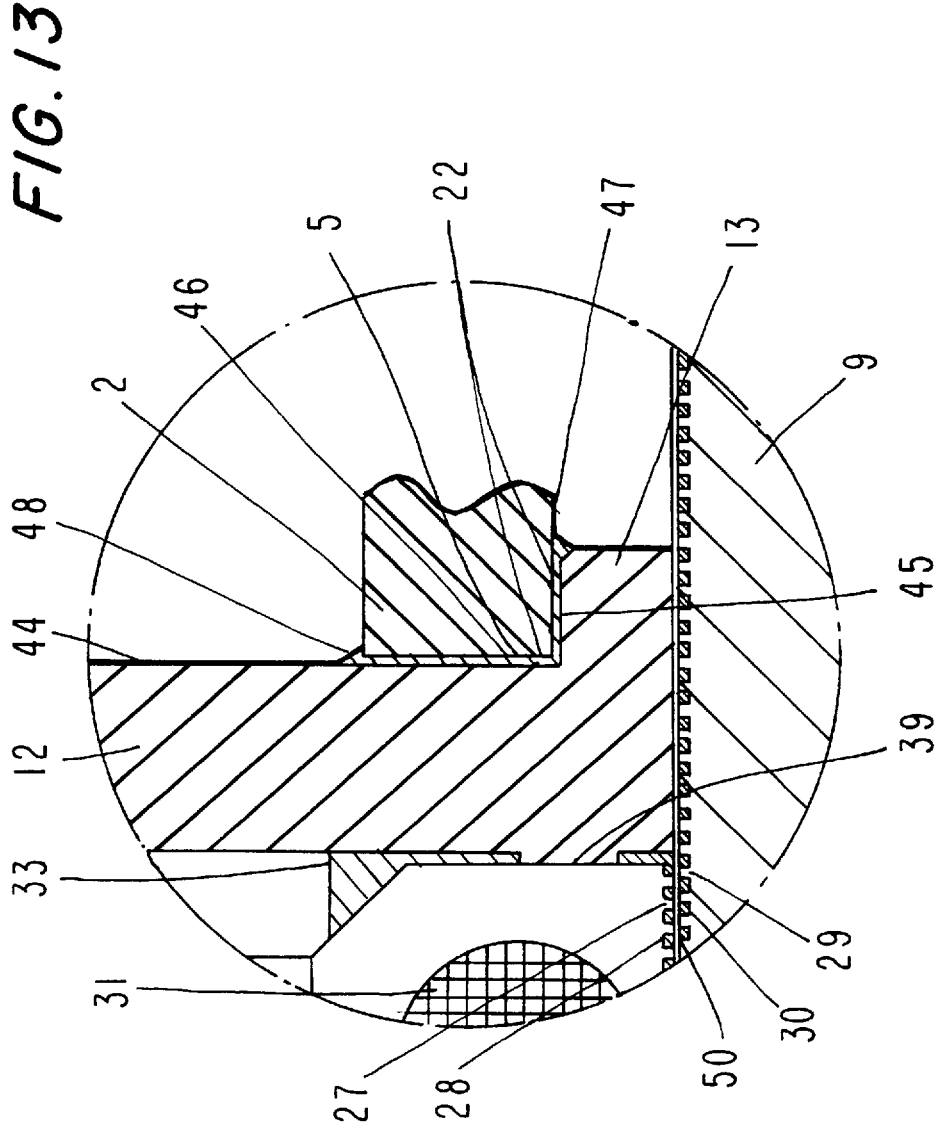
FIG. 13: shows a detail F of FIG. 12, for which the casting groove is represented on an enlarged scale.

In the left region, detail E, which is shown on an enlarged scale in FIG. 12, as well as detail F, which is shown on an enlarged scale in FIG. 13, are marked.

The superstructure 1 includes a mounting plate 2, and two modular components 3, and is on the stator 9. In each case, two windings 15, which in each case consist of two iron cores 32 with accommodated coil 31, are accommodated in each modular component 3. On each of the iron cores 32, a left magnet 34 and a right magnet 36, which are connected over a transverse yoke 35, are disposed, so that the two permanent magnets can act as a so-called left magnet 34 and as a so-called right magnet 36. The modular components 3 are provided in each case with a covering plate 36.

FIG. 12 shows a detail of FIG. 11 in the energized state and on an enlarged scale.

The stator 9 has stator teeth 29 and stator teeth gaps 30, which alternate. The iron cores 32, which are held by the two limiting ridges 39 with the spacer 38, together with coil 31, have in the upper region a left magnet 34 and thus a right magnet 36, both of which are short-circuited over the transverse yoke 35. The energized state is shown here, so that the field lines are guided over the left region 40. In the right region 41, there are no field lines. At the back of it, the motor teeth 27 of the winding 15 are over the stator teeth 29 of the stator 9 and the motor teeth gaps 28 are over the stator teeth gaps 30.

FIG. 13 shows a detail F of FIG. 11, the casting groove being shown on an enlarged scale. On the stator 9 with the stator teeth 29 and the stator teeth gaps 30, the superstructure 1 with a mounting plate 2 and a modular component 3 is located over the air gap 50. The modular component 3 is accommodated by the opening 5 in the mounting plate 2. Between the modular component 3 and the mounting plate 2, there is an alignment and gluing gap 22. The alignment and gluing gap 22 is filled with an adhesive composition 48, so that there is a certain elasticity. The alignment and gluing gap 42 is formed by the outer wall 44 of the modular component 3 with the inner wall 46 of the plate opening 5 of the mounting plate 2 as well as between the surface 45 of the modular component 3 and the undersurface 47 of the mounting plate 2. The modular component 3 has a housing 12 with the outer wall 44, as well as an iron core 32, which lies against the boundary ridge 39 and accommodates the coil 31, which is embedded by the casting composition 33. The iron core 32 has alternatively arranged motor teeth 27 and motor teeth gaps 28, which are opposite the alternatively arranged stator teeth 29 and stator teeth gaps 30. The height of the air gap is about 10 to 15 $\mu$m.

FIG. 14 shows a view of an inventive modular component from below. The iron cores 32 have two motor teeth 27 and motor teeth gaps 28. At the same time, left air nozzles 18 and right air nozzles 19 are provided. The edge 1 I has a surrounding ridge 13.

FIG. 15 shows a front view of an inventive modular component of FIG. 14 in section. The modular component 3, as component of the superstructure 1, has a surrounding ridge 13 at its edge 11 and the iron cores 32 have alternatively arranged motor teeth 27 and motor teeth gaps 28.

FIG. 16 shows a side view of an inventive modular component of FIG. 14 in section. The edge 11 has a surrounding ridge 13 with motor teeth 27 and motor teeth gaps 28 and structured iron cores 32.

We claim:

1. A modular planar motor, comprising:
   a stator;
   a mounting plate mounted on the stator and having a bottom surface and a plurality of openings therein, the openings having inner walls;
   at least two modular components accommodated in the openings of the mounting plate, each of the modular components having a housing with an outer wall and a peripheral ridge extending from the outer wall so as to define an outer surface, at least one winding arranged in the housing, at least one air nozzle arranged in the housing so as to permit generation of an individual air gap between the modular component and a surface of the stator, wherein the housing, the openings, the bottom surface of the mounting plate and the outer surface of the peripheral ridge are configured so that an alignment and gluing gap is formed between the outer wall of the housing and the inner wall of a corresponding one of the openings, and between the outer surface of the peripheral ridge and the bottom surface of the mounting plate; and
   an adhesive composition, which is slightly elastic and maintains elasticity after hardening, arranged to fill the alignment and gluing gap.

2. A modular planar motor according to claim 1, wherein the adhesive composition is an elastic epoxy resin.

3. A modular planar motor according to claim 1, wherein four of the modular components are provided, the four modular components including a first modular component and a second modular component arranged so as to operate in an x-direction, and a third modular component and a fourth modular component arranged at a right angle to the first and second modular components so as to operate in a y-direction.

4. A modular planar motor according to claim 1, wherein eight of the modular components are provided, the eight modular components being packed in groups of two aligned components, a first group and a second group of the components being arranged parallel to one another so as to work in an x-direction, and a third group and a fourth group of the components being arranged parallel to one another and at a right angle to the first and second groups as to work in a y-direction, the mounting plate having a centrally arranged recess therethrough.

5. A modular planar motor according to claim 1, and further comprising a connecting adapter, a terminal box fixed to the stator, and an electropneumatic flat conductor connected between the connecting adapter and the terminal box.

6. A modular planar motor according to claim 1, wherein the stator has a cross-structure formed by a plurality of parallel grooves which alternately form stator teeth and stator tooth gaps, the grooves being arranged into a first set that is normal to an x-direction and a second set which is normal to a y-direction so that the grooves of the first set are at a right angle to the grooves of the second step.

* * * * *